United States Patent [19]
Ilkbahar

[11] Patent Number: 6,026,456
[45] Date of Patent: *Feb. 15, 2000

[54] SYSTEM UTILIZING DISTRIBUTED ON-CHIP TERMINATION

[75] Inventor: Alper Ilkbahar, Santa Cruz, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,568

[22] Filed: Dec. 15, 1995

[51] Int. Cl.[7] .................. H03K 17/16; H03K 19/094; G06F 13/00
[52] U.S. Cl. .................. 710/101; 326/30; 326/86
[58] Field of Search .................. 326/30, 86; 395/281; 333/22

[56] References Cited

U.S. PATENT DOCUMENTS

| | | | |
|---|---|---|---|
| 4,120,029 | 10/1978 | Steiner | 395/182.13 |
| 4,942,398 | 7/1990 | Peterson | 326/30 |
| 5,023,488 | 6/1991 | Gunning | 307/475 |
| 5,134,311 | 7/1992 | Biber et al. | 326/30 |
| 5,214,320 | 5/1993 | Truong | 326/30 |
| 5,298,800 | 3/1994 | Dunlop et al. | 307/270 |
| 5,347,177 | 9/1994 | Lipp | 307/443 |
| 5,497,113 | 3/1996 | Uber | 326/27 |
| 5,498,990 | 3/1996 | Leung et al. | 326/30 |
| 5,546,016 | 8/1996 | Allen | 326/30 |
| 5,568,046 | 10/1996 | Samela et al. | 326/30 |
| 5,596,757 | 1/1997 | Smith | 326/30 |
| 5,635,852 | 6/1997 | Wallace | 326/30 |
| 5,687,330 | 11/1997 | Gist et al. | 326/30 |
| 5,689,655 | 11/1997 | Tanaka et al. | 326/30 |
| 5,767,695 | 6/1998 | Takekurka et al. | 326/30 |

OTHER PUBLICATIONS

"GTL:A Low Voltage Swing Transmission Line Tranceiver"pp. 1–6 (Mar. 1991).

T. Knight, Jr. et al. "A Self–Terminating Low–Voltage Swing CMOS Output Driver", *IEEE Journal of Solid–State Circuits*, vol. 23, No. 2, pp. 457–464 (Apr. 1988).

T. Kawahara et al. "Complementary Selective Writing by Direct–Write E–Beam/Optical Lithography Using Mixed Positive and Negative Resist", Symposium on VLSI Circuits Digest of Technical Papers, 4.6, pp. 45–46 (1994).

T. Saton, *Fujitsu Terminated LVTTL (CTT) Presentation*, (May 1993).

D. Fenwick, et al., "The AlphaServer 8000 Series: High–end Server Platform Development ", Copyright 1995 Digital Equipment Corporation.

M. Dolle, "A Dynamic Line–Termination Circuit for Multireceiver Nets", *IEEE Journal on Solid–State Circuits*, vol. 28., No.12, pp. 1370–1373 (Dec. 1993).

*Primary Examiner*—Paul R. Myers
*Attorney, Agent, or Firm*—Jeffrey S. Draeger

[57] ABSTRACT

A system utilizing distributed on-chip termination. The system comprises a bus having a signal line and a first bus agent which is coupled to the bus. The first bus agent has a first termination circuit which is coupled to selectably terminate the signal line to a termination voltage. The system may further comprise an additional bus agent. The additional bus agent has a second termination circuit coupled to selectably terminate the signal line to the termination voltage. The bus in the system has a bus impedance, and the impedance of the termination circuit(s) is typically greater than twice the bus impedance.

46 Claims, 5 Drawing Sheets

SYSTEM UTILIZING DISTRIBUTED ON-CHIP TERMINATION

FIELD OF THE INVENTION

The present invention pertains to the field of system bus configurations and specifically, systems utilizing distributed termination.

BACKGROUND

Increasing bus speed in an electronic system is a fundamental hurdle in higher performance system design. The system bus often limits overall system performance since the bus provides the means of communication between system components. Many factors complicate the task of increasing the frequency of switching the bus.

In general, signal distortion caused by various transmission line effects such as ringing and wave reflection increases when switching frequency increases. A malfunction can ultimately occur when the distortion is large enough to cause an erroneous voltage level to be sampled. Thus, improved measures are required to compensate for these increasing transmission line effects.

Wave reflections generally occur at discontinuities in signal lines and are often the primary source of signal distortion. Stubs or branches in the bus, device connections, and physical ends of buses are all examples of discontinuities in the bus. Consequently, a reconfiguration which adds devices, removes devices, or changes stub lengths alters the wave reflections in a system. This increases the difficulty of reconfiguring the system.

Modern computer systems often need to be scalable and upgradeable, making reconfiguration difficulties highly undesirable. A scalable computer system allows enhancement of computing power by adding components. For example, a second, third, or fourth microprocessor may be added to a scalable system to increase processing throughput. An upgradeable computer system may allow the addition of components or may allow removal and replacement of a particular component such as a microprocessor. Such system enhancement may be unduly limited in computer systems which are difficult to reconfigure.

Bus terminations limit wave reflections in some prior art systems. One prior art scheme is addressed in "A Dynamic Line-Termination Circuit for Multireceiver Nets", *IEEE Journal on Solid-State Circuits,* Vol. 28, No. 12, December 1993, pages 1370–1373. In this reference, the receiver terminates a line to incoming signal values. This scheme essentially implements a keeper formed by an input buffer and an active termination device which immediately drives values back onto the line. The keeper thus latches values as they are received on the signal line. Process variations and changing operating conditions can reduce the effectiveness of this scheme by causing keeper impedance to drift and no longer match the line impedance.

In this prior art scheme, the switching of the active termination device during an incident voltage wave can produce a step voltage on the signal line. In a typical application, many such dynamic termination circuits are used on a signal line, and each termination circuit will contribute to signal line noise with its step voltage, resulting in the incident voltage wave being altered by each of the termination circuits. These noise-causing step voltages occur at different times since the receivers are generally located at different distances from the source of the wave. Additionally, once all of the receivers have switched and are terminating the signal line to its present value, the next time a driver tries to drive the opposite value on the signal line, it will have to overcome all of the active termination devices. This may result in poor performance in a system with many receivers, especially since the termination device impedance is as low as the line impedance.

Thus, the prior art termination circuit does not terminate using an impedance greater than the bus impedance, nor does it provide a termination which is coupled to selectably terminate the bus to a termination voltage. As a result, the bus is continuously terminated by all receivers at the bus impedance. Such termination can detriment system switching performance.

Other prior art systems terminate ends of a bus with discrete termination resistors. Often, these termination resistors add to system cost by requiring longer circuit board routing, additional stubs, and/or additional circuit board layers. The resistors, which may be individually packaged or integrated into a bus termination chip, also increase computer system costs. Extra stubs added to accommodate the termination resistors generally complicate the bus network and increase system noise (such as wave reflection).

As wave reflections increase, end terminations may not provide sufficient system noise control. This may be true even if a termination is provided on the same circuit card as the bus driver. Consider an off-chip termination for an output driver on an integrated circuit chip in a typical package. A first conductor typically couples the driver on the chip to a connection on a circuit board. Another conductor couples the termination to the chip. Finally, the chip is coupled to the system bus. As a result of this three way connection, the noise generated at the chip reaches both the system bus and the termination.

Minor system reconfiguration can adversely affect a high speed computer system with end terminations because any new or different wave reflections caused by these changes propagate all the way to the bus end before being terminated. This may be problematic in a scalable or upgradeable computer system which requires the ability to reconfigure by adding or changing bus components. Additionally, a system designer may wish to alter a particular stub length if the system needs redesign or improvement.

Resistive end terminations are generally continuously enabled and terminate the bus with a resistance matching the characteristic impedance of the bus. A low characteristic impedance bus advantageously allows a given driver to provide high current through a signal line, providing fast switching for a given load. Unfortunately, when a matched termination is used, low impedance translates to a large current flow through the termination. Thus, efforts to conserve power are hampered when such matched terminations are used and bus impedance is lowered to boost performance.

Accordingly, numerous problems afflict prior art terminated computer system buses. System reconfiguration and enhancement are difficult in some systems. Other systems generate noise in their attempts to reduce it, consume excessive amounts of power, or fluctuate in effectiveness due to processing and operating conditions. System cost is often increased by the addition of termination components, and many termination systems are simply becoming inadequate as bus frequencies increase.

Prior art resistive termination circuits generally do not terminate using an impedance greater than the bus impedance. Nor are the terminations distributed throughout the system and coupled to selectably terminate to a termination voltage.

SUMMARY

A system utilizing distributed on-chip termination is disclosed. The system comprises a bus having a signal line and a first bus agent which is coupled to the bus. A termination circuit is coupled to selectably terminate the signal line to a termination voltage. Additional bus agents and terminations may also be included.

The system may further comprise an additional bus agent which has a second termination circuit coupled to selectably terminate the signal line to the termination voltage.

The bus in the system has a bus impedance, and the impedance of the termination circuit(s) is typically greater than twice the bus impedance. The termination circuit may comprise first and second pullups controlled by a control circuit which is coupled to receive a process compensation factor from a process compensation circuit.

BRIEF DESCRIPTION OF THE FIGURES

The present invention is illustrated by way of example and not limitation in the figures of the accompanying drawings.

DETAILED DESCRIPTION

A computer system utilizing distributed on-chip termination is described. In the following description, numerous specific details are set forth, such as target impedances, voltage levels, and signaling nomenclature, in order to provide a thorough understanding of an embodiment of the present invention. It will be appreciated by those skilled in the art that the present invention may be practiced without these specific details.

Figure 1:
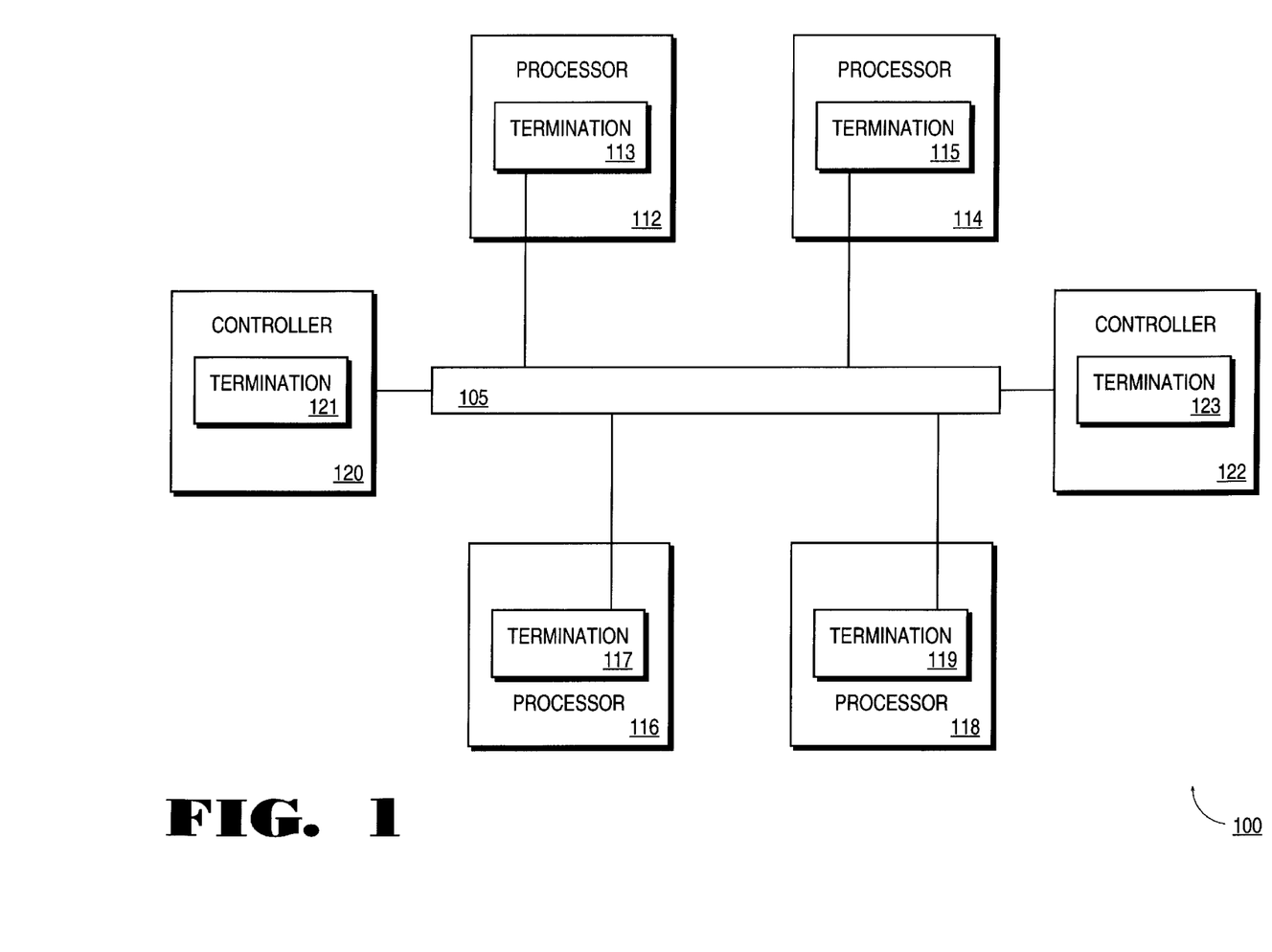
FIG. 1 is a block diagram of a computer system utilizing a distributed termination scheme of the present invention.

This disclosure describes an advantageous method and apparatus utilizing distributed on-chip termination embodied in a distributed on-chip termination (DOT) system and a modified DOT system. FIG. 1 illustrates a basic DOT system wherein a plurality of bus agents include integrated termination circuits to reduce system noise. A modified DOT system illustrated in FIG. 2 includes bus agents having integrated terminations supplemented by discrete terminations. These two types of systems are collectively referred to herein as DOT systems.

Different embodiments of these DOT systems can include features including selectable termination to a termination voltage, termination using an impedance greater than the bus impedance, and distribution of termination throughout the system. This disclosure discusses computer systems as examples of such DOT systems; however, it will be appreciated that DOT systems could be implemented in any device where bus agents communicate through a bus.

These DOT systems achieve high frequency operation while delivering cost effectiveness and simplicity of system design. Distributed terminations squelch high frequency noise close to its origin. This distributed noise attenuation capacity provides a system designer the advantage of flexibility in component placement and system reconfiguration.

Elimination of components and wiring by integrating terminations also reduces costs. In one DOT embodiment, the cost of external termination is spared. Both DOT systems avoid the additional complexity and cost of connecting separate terminations for each bus agent, saving as much as two complete layers of circuit board routing. Such system cost savings far outweigh the costs of integrating the termination circuits on-chip.

FIG. 1 illustrates a block diagram of a computer system 100 which utilizes distributed on-chip termination. The DOT computer system 100 comprises a bus 105 having a plurality of signal lines, and a plurality of bus agents having termination circuits. In one mode, a bus agent can be a processor. In other modes, bus controllers, signal processing chips, memory devices, or virtually any other type of chip or multi-chip module could be a bus agent. Processors 112, 114, 116, and 118 have a termination 113, 115, 117, and 119, respectively. A bus controller 120 has a termination 121, and a bus controller 122 has a termination 123.

Each bus agent utilizes a termination to attenuate signal line noise. This scheme not only reduces wave reflections which may occur due to signal line discontinuities at each agent, but also attenuates noise generally propagating down the bus 105.

Other embodiments of the present invention may use more or less than six bus agents. Further, the locations and functions of the particular bus agents may be adjusted according to specific requirements of a system. One favorable embodiment uses a plurality of processors having termination circuits coupled to a bus with opposite ends respectively terminated by a discrete termination device and a bus controller.

Figure 2:
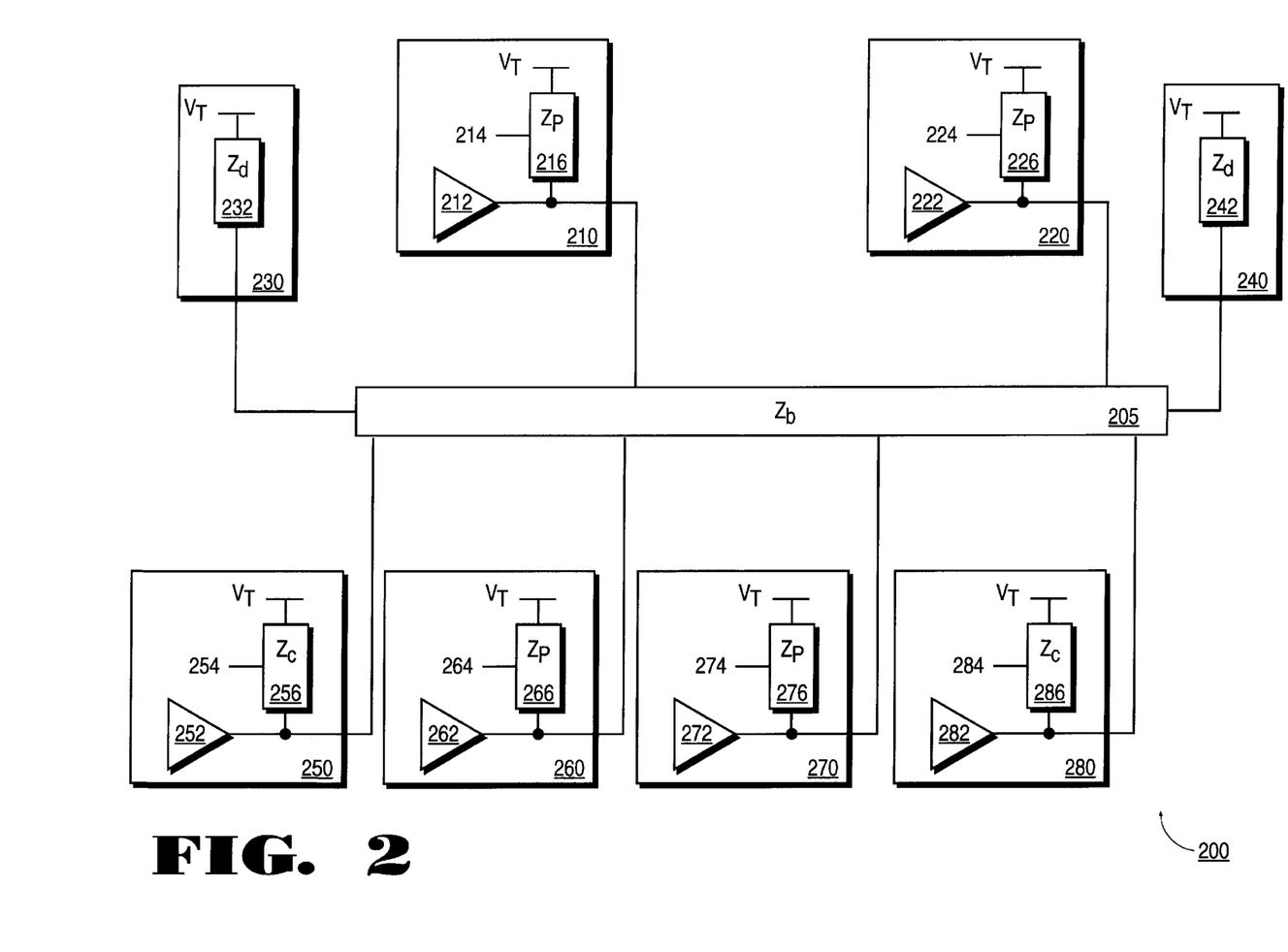
FIG. 2 is a partial schematic representation of a computer system utilizing a modified distributed termination scheme of the present invention.

FIG. 2 illustrates a modified DOT computer system 200. This computer system comprises a bus 205, a plurality of bus agents, and a plurality of terminating agents. In one embodiment, two of the bus agents are bus controllers, and the other bus agents are processors. As above, other bus agents can be used.

A terminating agent 230 is coupled to a first end of the bus 205. The terminating agent 230 comprises a termination 232 which is a discrete termination coupling the bus to a termination voltage (Vt). The termination 232 has an impedance designated Zd. A terminating agent 240 comprising a termination 242 is coupled to a second end of the bus 205 and couples the bus to Vt. The terminating agent 240 also has an impedance of Zd. These terminations are called discrete since they are not integrated with a processor or a bus controller. In this specification, numerous discrete terminations integrated into one chip are still referred to as discrete terminations. Thus, "discrete termination" refers to a component which interfaces with the bus primarily for the purpose of terminating one or more signal lines.

The termination voltage (Vt) is typically a high power rail (Vcc) of a bus agent. Alternately, a low power rail (Vss), an intermediate voltage, or a voltage above Vcc may be used. For example, one of the bus agents could be built using a technology which operates with a different power supply voltage than another bus agent. In this case, it may be convenient to either input or generate on chip a voltage to use for the termination voltage.

One bus agent 210 is a processor and comprises an output driver 212 and a termination 216 which is a processor termination having an impedance designated Zp. The termination 216 selectably couples the bus 205 to Vt according to a control input 214 which enables the termination. Bus agents 220, 260, and 270 are also processors and include, respectively, output drivers 222, 262, and 272. The bus agents 220, 260, and 270 have terminations 226, 266, and 276 respectively controlled by control inputs 224, 264, and 274. Each termination selectably terminates the bus 205 to Vt according to its control input.

Another bus agent 250 is a bus controller and comprises an output driver 252 and a termination 256 which is a controller termination having an impedance designated Zc. The termination 256 selectably couples the bus 205 to Vt according to a control input 254 which enables the termination. Similarly, a bus agent 280 is another bus controller and comprises an output driver 282 and a termination 286 which is a controller termination having the impedance Zc. The termination 286 selectably couples the bus 205 to Vt according to a control input 284.

Impedance of a particular termination is generally an inherent characteristic of the terminating device which varies with operating conditions. For example, the resistance of a typical resistor fluctuates when temperature changes. The impedance of a device such as a MOS transistor fluctuates not only due to temperature, but also due to the voltage being terminated. Thus in a typical bi-level signaling scheme using a low and a high voltage, the MOS transistor exhibits a different impedance at each voltage. A P channel MOS transistor used in one embodiment exhibited fluctuation of approximately thirty-three percent between the low and high voltages. Larger fluctuations of fifty percent or more could easily occur in devices having a design which makes them more susceptible to changed operating conditions.

For the purposes of this specification, discussions of the impedance value of a termination refer to an impedance measured when terminating the low voltage on the bus. Since several embodiments discussed herein use a termination voltage of the high voltage on the bus and maximum power dissipation generally occurs when the bus is driven and terminated to opposite values, this impedance measure gives insight into the expected maximum power dissipation of the termination. Alternate impedance measurement could exaggerate or downplay the mathematical relationships between various terminating devices in a computer system. It is therefore to be understood that each impedance discussed represents a target or nominal impedance, and that embodiments of the present invention only approximate the given impedance values and ratios and may substantially diverge therefrom under certain conditions.

The modified DOT system of FIG. 2 is modified in order to reduce termination related power dissipation in bus controllers. Bus controllers are typically smaller chips than processors and may not be able to accommodate a substantial increase in power dissipation resulting from the integration of termination devices. Accordingly, a modified DOT system relieves the bus controllers from at least a portion of their termination duties. The optional terminating agents 230 and 240 compensate for this loss in system termination capacity.

In one embodiment, the bus has a bus impedance (Zb) of 50 Ohms, and the processor termination impedance (Zp) is three times Zb. With the discrete termination impedance (Zd) also set to three times Zb, the controller termination is unnecessary. Alternately, a Zc which is greater than Zp could be provided to enhance signal quality as long as Zc is high enough to prevent excess power consumption on the bus controller.

In both the DOT and the modified DOT systems, signal quality improves at the expense of power as Zp is decreased. However, Zp is preferably kept greater than twice Zb since reducing impedance increases the difficulty of switching the bus away from Vt.

The DOT computer system of FIG. 1 does not require increased termination impedance on the bus controllers. Consequently, Zp and Zc may both be set to three times the bus impedance. It should be understood that the individual processors and bus controllers may have different impedances. Many permutations altering the number and type of bus agents and the termination impedances thereon will be apparent to the skilled artisan upon reading this disclosure.

Figure 3:
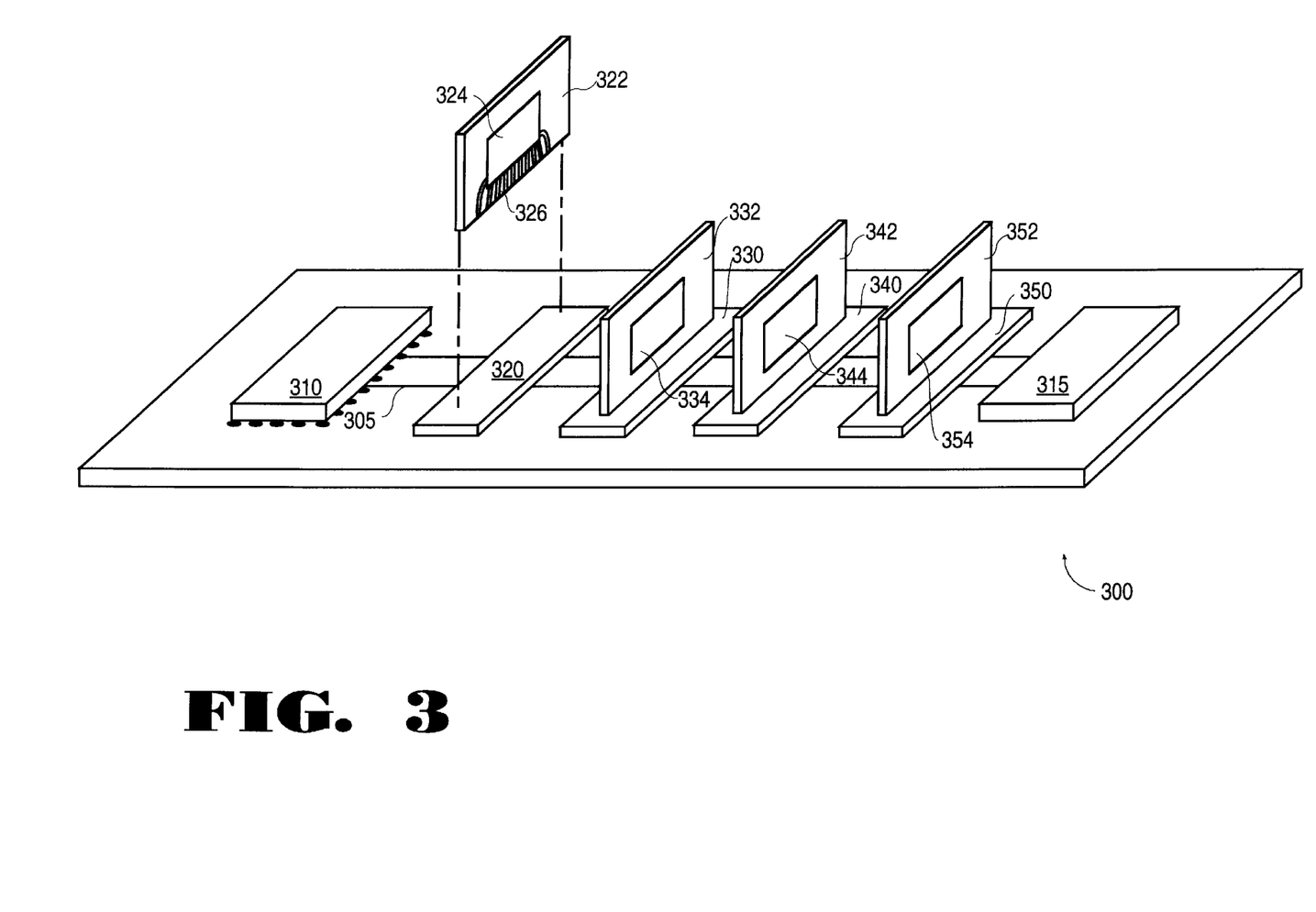
FIG. 3 is an elevation view of a motherboard used in one embodiment of the present invention.

In a typical computer, the DOT and modified DOT systems reside on a motherboard. FIG. 3 illustrates one embodiment of a motherboard 300 for a DOT system. The motherboard 300 has a bus 305 disposed on a surface which could be a layer on or within the motherboard. Bus controllers 310 and 315 are respectively coupled to a first and a second end of the bus 305. Connectors 320 and 340 are disposed on the surface of the motherboard and coupled to the bus. Connectors 330 and 350 are also disposed on the surface of the motherboard and coupled to the bus.

A daughtercard 342 (also referred to as a circuit card) is engaged by connector 340 and thereby coupled to the bus. Another daughtercard 332 is coupled to the bus through connector 330. Connectors 320 and 350 are similarly mounted on the motherboard. These connectors enable scaling and upgrading the motherboard to provide increased computing power. Additional circuit cards such as daughtercard 322 and daughtercard 352 can be coupled to the bus as desired.

The daughtercards 322, 332, 342, and 352 respectively support integrated circuits 324, 334, 344, and 354. A set of signal lines 326 is available to couple the integrated circuit 324 to the connector 320 when the connector engages the daughtercard. The integrated circuits, as well as the bus controllers 310 and 315, include termination circuits. Since each bus agent provides termination, the daughtercards 322 and 352 can be added without requiring system reconfiguration. Similarly, these or other daughtercards could be removed and/or upgraded. The motherboard is thus upgradeable and scalable without requiring substantial system adjustments.

Advanced component mounting and connection techniques help provide a high speed motherboard. For example, a bus controller may utilize ball grid array (BGA) technology as depicted for bus controller 310. Additionally, the integrated circuits may be flip mounted directly on the daughtercards. If BGA technology is not used, the bus controllers could be flip mounted to the motherboard. Also, one or more of the processors could be flip mounted to the motherboard. These mounting and connection technologies used in conjunction with distributed on-chip termination enable the progression to faster and faster bus speeds.

Figure 4:
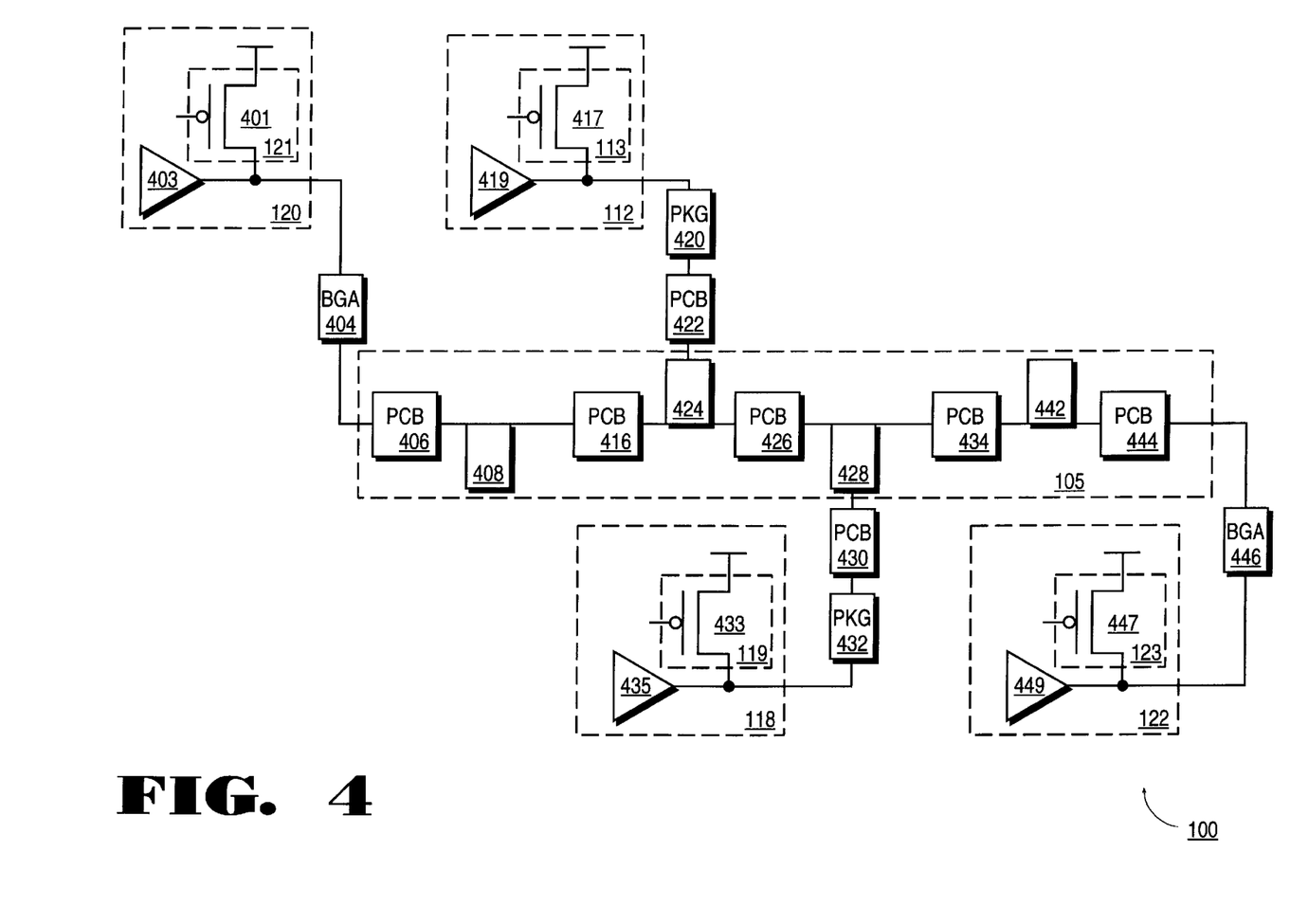
FIG. 4 is a partial schematic representation of an embodiment of the computer system of FIG. 1.

FIG. 4 illustrates details of one embodiment of the DOT system 100 from FIG. 1. Bus controllers 120 and 122 as well as the processors 112 and 118. In this embodiment, the terminations 113, 119, 121, and 123 are P channel MOS transistors 417, 433, 401, and 447, respectively. These terminations selectably couple the bus to a termination voltage, and other selectably enabled devices such as N channel transistors, bipolar transistors, or a combination thereof could be used.

Each bus agent has one of a plurality of output drivers 419, 435, 403, and 449. Each of the plurality of output drivers drives at least one of the high and the low voltage levels on the bus, but each driver may be designed differently.

FIG. 4 also illustrates connectivity details for one particular embodiment of the invention; however, a high degree of flexibility in arranging and including or excluding various computer system components makes many other configurations possible. Here the bus 105 comprises a plurality of printed circuit board (PCB) sections 406, 416, 426, 434, and 444. The bus controller 120 utilizes BGA mounting technology and is coupled to PCB section 406 through a BGA mount 404. Similarly, the bus controller 122 is coupled to PCB section 444 through a BGA mount 446.

The processor 112 is mounted on a daughtercard, and a package trace 420, a PCB section 422, and a connector 424 couple the processor 112 to the bus 105. The processor 118 is similarly mounted on a daughtercards. The processor 118 is coupled by a package trace 432, a PCB section 430, and a connector 428 to the bus. Connectors 408 and 442 are available to connect optional bus agents. In an alternate embodiment, the system includes only one processor.

A stub generally comprises conductors spanning a distance between the bus and a component. For example, in this computer system, a stub for the processor 112 is defined by the connector 424, the PCB section 422, and the package trace 420. A spacing distance is generally a distance between stubs such as that defined by the PCB section 416 between the stub for the processor 112 and a stub for the processor 116.

While reducing spanning distances and stub lengths advantageously reduces signal flight times, heat and spatial limitations complicate such miniaturization. The DOT system allows stub lengths and spacing distances to be varied so that cost effective heat and spatial solutions can be adopted.

For example, both DOT systems allow more flexibility than conventional high speed systems. These systems remain functional at suitably high frequencies with one inch spacing and two inch to three inch stub lengths. With one and one-half inch spacing, up to two and one-half inch stubs remain viable. Thus, package traces and PCB sections limited to approximately one inch provide one workable high frequency embodiment. While one embodiment yielded such results, many different combinations of mounting, connecting, and terminating technologies will advantageously derive substantial flexibility from use of distributed on-chip termination.

Figure 5:
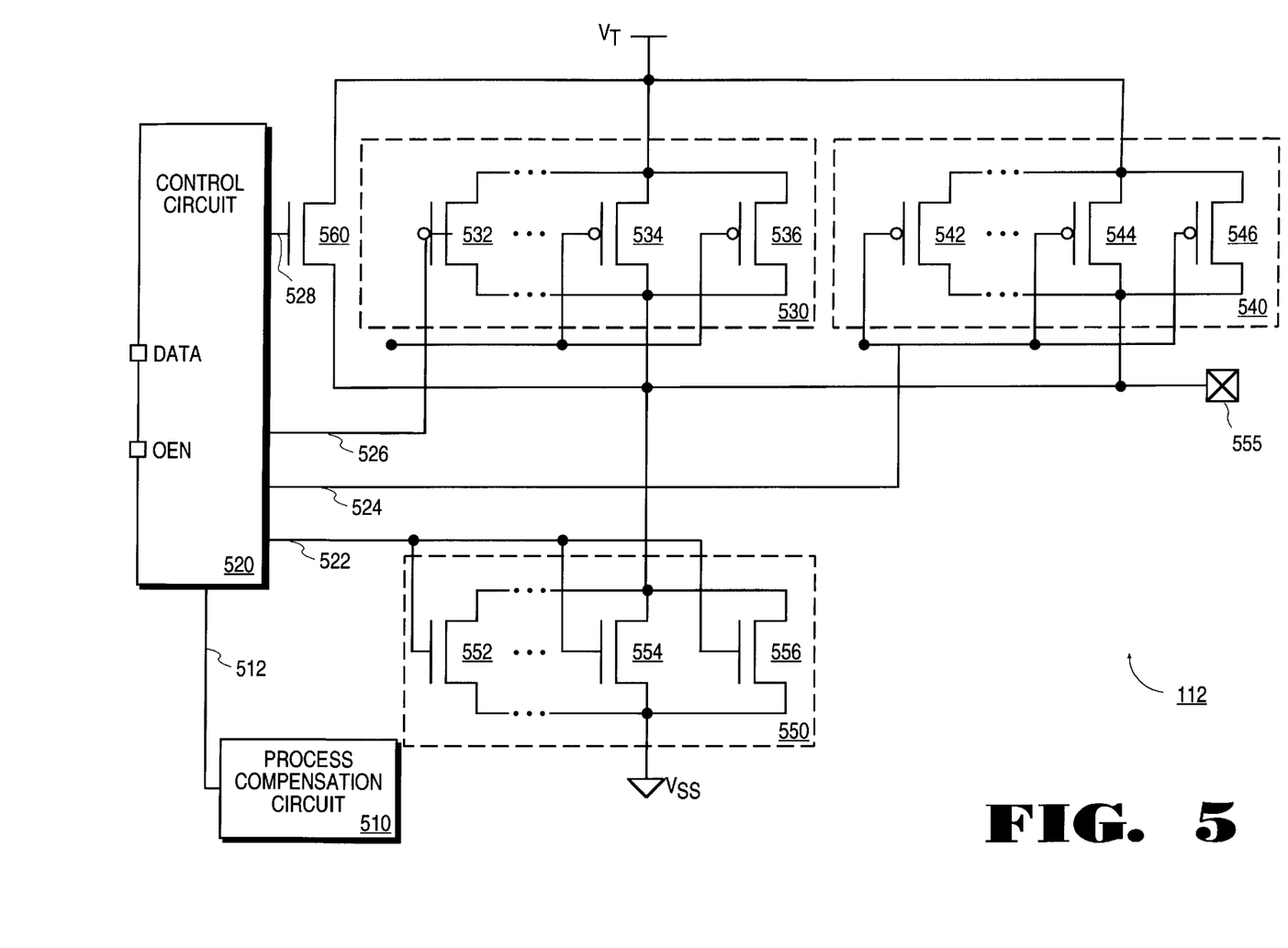
FIG. 5 is a schematic representation of a termination circuit used in an embodiment of the present invention.

Another changeable component in the DOT system is the termination itself. FIG. 5 shows one embodiment of the processor 112 including a suitable termination circuit as well as an output driver circuit. This termination circuit could be used in any or all of the bus agents of the DOT systems and is not restricted to processors.

The termination circuit comprises a first and a second pullup device. Here, the first pullup is a transistor 560, and the second pullup is a plurality of transistors represented as a pullup 540. The transistor 560, a N channel MOS transistor, selectably couples an interface node 555 to the termination voltage (Vt) according to a control line 528. The pullup 540 comprises transistors 542, 544, and 546 which are P channel transistors and selectably couple the interface node 555 to Vt according to a control bus 524.

The termination circuit further comprises a process compensation circuit 510 and a control circuit 520. The processor 112 also includes the output driver which comprises a pullup 530 controlled by a control bus 526 and a pulldown 550 controlled by a control bus 522.

The pullup 530 comprises a plurality of P channel transistors 532, 534, and 536 which can enable a path from the interface node 555 to Vt according to the control bus 526. The pulldown 550 comprises a plurality of N channel transistors 552, 554, and 556 which can enable a path from the interface node 555 to Vss according to the control bus 522.

The pullups 530 and 540 and the pulldown 550 are described as comprising a plurality of transistors. When such a pullup or pulldown is said to be enabled, this simply means that at least one of the plurality of transistors is enabled. This arrangement of transistors may be referred to as stacked transistors or as a single transistor with many legs. The purpose of this arrangement is to adjust the impedance of the pullup or pulldown device by enabling a variable number of transistors or legs. Increasing the number of enabled transistors decreases the total impedance and vice versa.

The process compensation circuit 510 delivers a process compensation factor which may be a multiple bit process compensation signal or a voltage level on a bus 512. The process compensation signal provides a relative measure of the performance of devices on the processor by sensing an operating characteristic of one or more of such devices. Typically, the operating characteristic used is device impedance which can be measured through a current flow and/or a voltage drop in a given device. Process compensation circuits are well known in the art and may measure other operating characteristics and/or use other measurement techniques.

Device performance may vary from chip to chip or on a single chip at different times. Performance varies from chip to chip due to physical characteristics defined during manufacture. Performance varies over time due to degradation or changing operating conditions. For example, a typical MOS device operates more slowly (i.e. has a higher impedance) as temperature rises.

The control circuit 520 utilizes the process compensation factor to select a variable number of transistors to best provide the target impedance Zp. The variable number changes if the process compensation signal indicates a sufficiently large change in operating conditions.

A DATA input and an OEN (output enable) input to the control circuit 520 determine whether the processor 112 drives a high voltage (Vt), drives a low voltage (Vss), terminates, or tristates. The processor tristates the interface node 555 when the OEN input is inactive, by disabling at least the driver pullup and pulldown logic coupled to that node. If the OEN input is active, the processor 112 drives the high voltage or drives the low voltage according to the DATA input.

In order to drive the low voltage, the control circuit enables the pulldown 550 and disables the pullups 530, 540, and 560. To drive the high voltage, the control circuit enables the pullup 530 and disables the pulldown 550. The control circuit 520 enables the pullup 560 and the pullup 540 to terminate the interface node 555 unless the pulldown is enabled. The control circuit 520 may be configured to disable the termination pullups 540 and 560 at other times as well. For example, the termination on one of the bus agents of a DOT system could be disabled if other terminations in the system provide sufficient noise attenuation.

Accordingly, the distributed on-chip termination scheme can disable terminations at least when the chip driver and the on-chip termination would otherwise be in contention. Intelligent control of the terminations thereby yields power savings relative to a system with constantly enabled terminations. The integration of the terminations onto the chip makes possible such intelligent termination control by providing practical access to appropriate control circuits.

In one embodiment, the pullups 530 and 540 and the pulldown 560 each comprise sixteen individual transistors. The sizes are empirically chosen but predominantly depend on the bus impedance, the desired power consumption, and the characteristics of the devices being used. In this embodiment, the transistor 560 is not split into multiple transistors. Since only a small N channel transistor is needed to provide the appropriate total termination, it was not convenient to divide the transistor in this case. Clearly, the transistor 560 could be split into a plurality of transistors under slightly different circumstances.

Thus, the present computer system provides a high speed bus utilizing distributed on-chip termination. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
   a bus having a signal line;
   a first bus agent having a first termination, the first termination having a first enable input coupled to receive a first control signal which disables the first termination, which is otherwise enabled, from terminating the signal line to the termination voltage in contention with a signal line driver if the signal line is driven low by the first bus agent; and
   a second bus agent having a second termination, the second termination having a second enable input coupled to receive a second control signal which disables the second termination, which is otherwise enabled, from terminating the signal line to the termination voltage in contention with a signal line driver if the signal line is driven low by the second bus agent.

2. The system of claim 1 wherein the first termination voltage is the same as the second termination voltage.

3. The system of claim 1 wherein the signal line has a bus impedance, the first termination has a first impedance of at least twice the bus impedance, and the second termination has an impedance of at least twice the bus impedance.

4. The system of claim 1 wherein the first bus agent further comprises a control circuit coupled to the first enable of the first termination and a process compensation circuit coupled to the control circuit.

5. A system comprising:
   a bus having a signal line;
   a first bus agent coupled to the bus; and
   a first termination coupled to selectably terminate the signal line to a termination voltage, which is a high termination voltage, unless the signal line is driven low by the first bus agent.

6. The system of claim 5 further comprising a second bus agent coupled to the bus, the second bus agent having a second termination coupled to selectably terminate the signal line to the termination voltage unless the signal line is driven low by the second bus agent.

7. The system of claim 5 wherein the signal line has a bus impedance and the first termination circuit has a terminating impedance of at least twice the bus impedance.

8. The system of claim 5 wherein the first bus agent is a processor and the first termination is a processor termination circuit, the system further comprising:
   a first bus controller coupled to the bus, the first bus controller having a controller termination circuit, the controller termination circuit being coupled to selectably terminate the signal line to the termination voltage unless the signal line is driven low by the first bus controller.

9. The system of claim 8 further comprising:
   a plurality of processors, each of the plurality of processors having one of a plurality of processor termination circuits, the plurality of processor termination circuits being coupled to selectably terminate the signal line to the termination voltage unless that processor is driving the signal line low; and
   a second bus controller coupled to the bus, the second bus controller having a second controller termination circuit, the second controller termination circuit being coupled to selectably terminate the signal line to the termination voltage unless the signal line is driven low by the second bus controller.

10. The system of claim 8 wherein the plurality of processors comprises a second, third, and fourth processor.

11. The system of claim 6 wherein the signal line has a bus impedance and the first termination and the second termination have terminating impedances of at least twice the bus impedance.

12. The system of claim 6 wherein the signal line has a bus impedance and the first termination and the second termination each have an impedance of approximately three times the bus impedance.

13. The system of claim 6 further comprising a discrete termination circuit coupled to terminate the signal line to the termination voltage.

14. The system of claim 8 wherein the bus has a bus impedance, the processor termination circuit has a first impedance of approximately three times the bus impedance, and the controller termination circuit has a second impedance greater than the impedance of the first termination.

15. A system comprising:
   a bus having a signal line:
   a first bus agent coupled to the bus: and
   a first termination coupled to selectable terminate the signal line to a termination voltage, the termination comprising:
     a first pullup device coupled to selectably terminate the signal line to the termination voltage;
     a second pullup device coupled to selectably terminate the signal line to the termination voltage; and
     a control circuit coupled to the first and second pullup devices for disabling the first and second pullup devices when the first bus agent drives the signal line to a low voltage.

16. The system of claim 15 wherein the first bus agent further comprises a process compensation circuit coupled to the control circuit for generating a process compensation signal, the first pullup device comprises a first plurality of transistors, and the control circuit enables a first variable number of transistors from the first plurality of transistors according to the process compensation signal.

17. The system of claim 16 wherein the first plurality of transistors are P channel MOS transistors and the second pullup device is a N channel MOS transistor.

18. The system of claim 16 wherein the first bus agent further comprises a driver pullup device and a driver pulldown device, both the first pullup device and the second pullup device being coupled to drive the signal line and controlled by the control circuit.

19. The system of claim 18 wherein the driver pullup device comprises a second plurality of transistors, the driver pulldown device comprises a third plurality of transistors, the control circuit is capable of enabling a second variable number of transistors from the second plurality of transistors, and the control circuit is capable of enabling a third variable number of transistors from the third plurality of transistors, the second and the third variable numbers being set by the control circuit according to the process compensation signal.

20. The system of claim 19 wherein the first variable number equals the second variable number.

21. The system of claim 18 wherein the driver pullup device is connected in parallel with the first and second pullup device and drives the signal line to the termination voltage.

22. The system of claim 15 wherein the first pullup device is a P channel MOS transistor and the second pullup device is a N channel MOS transistor.

23. The system of claim 5 wherein the system is a scalable system further comprising:
a socket for accepting an additional bus agent which includes an additional termination for terminating the signal line to the termination voltage.

24. The system of claim 23 wherein the first bus agent is removably coupled to the bus, allowing upgrades to the system.

25. A computer system comprising:
a bus having a signal line characterized by a bus impedance;
a first processor coupled to the bus, the first processor having a processor termination circuit, the processor termination circuit being coupled to the signal line and having a termination impedance of at least twice the bus impedance, the processor termination circuit comprising:
a first pullup device coupled to selectably terminate the signal line to a termination voltage;
a second pullup device coupled to selectable terminate the signal line to the termination voltage; and
a control circuit coupled to the first and second pullup devices for disabling the first and second pullup devices when the first processor drives the signal line to a low voltage; and
a first bus controller coupled to the bus, the first bus controller having a controller termination circuit, the controller termination circuit being coupled the signal line and having a second termination impedance of at least twice the bus impedance.

26. The computer system of claim 25 wherein the processor termination circuit and the controller termination circuit are coupled to selectably terminate the signal line to a termination voltage.

27. The computer system of claim 25 wherein the first processor further comprises a process compensation circuit coupled to the control circuit for generating a process compensation signal, the first pullup device comprises a first plurality of transistors, and the control circuit enables a first variable number of the first plurality of transistors according to the process compensation signal.

28. A computer system comprising:
a bus having a signal line characterized by a bus impedance;
a plurality of processors coupled to the bus, each processor having a processor termination circuit, the processor termination circuit of each processor being coupled to terminate the signal line to a termination voltage and having a first termination impedance of at least twice the bus impedance, each termination circuit having an enable input coupled to receive a control signal which disables the termination circuit, which is otherwise enabled, from terminating the signal line to the termination voltage in contention with a signal line driver if the signal line is driven low by that processor;
a first bus controller coupled to the bus;
a second bus controller coupled to the bus;
a first discrete termination circuit, the first discrete termination circuit being coupled to a first end of the signal line;
a second discrete termination circuit, the second discrete termination circuit being coupled to a second end of the signal line.

29. The computer system of claim 28 wherein the first and second discrete termination circuits each have a discrete termination impedance of approximately three times the bus impedance.

30. The computer system of claim 28 wherein the first bus controller has a first controller termination circuit, the second bus controller has a second controller termination circuit, and the first and second controller termination circuits are coupled to terminate the signal line to the termination voltage.

31. An apparatus comprising:
a bus having a signal line, the bus disposed on the motherboard and having a first and a second end;
a plurality of bus agents coupled to the bus, each bus agent having one of a plurality of termination circuits, the termination circuit of each bus agent being coupled to selectably terminate the signal line to a termination voltage, which is a high termination voltage, unless that bus agent is driving the signal line low;
a first bus controller coupled to the bus;
a second bus controller coupled to the bus;
a first termination circuit coupled to terminate the signal line to the termination voltage at the first end of the bus; and
a second termination circuit coupled to terminate the signal line to the termination voltage at the second end of the bus.

32. The apparatus of claim 31 wherein the motherboard defines a first surface, the plurality of bus agents comprises a first and a second processor, the first processor is mounted on a first circuit card, the second processor is mounted on a second circuit card, the first and second circuit cards and the first and second bus controllers are mounted on the first surface.

33. The apparatus of claim 32 wherein the first bus controller includes a first controller termination circuit and the second controller includes a second controller termination circuit, the first and the second controller termination circuits selectably terminating the signal line to the termination voltage.

34. The apparatus of claim 33 wherein the signal line is characterized by a bus impedance, the processor termination circuits and the first and second controller termination circuits have impedances of at least twice the bus impedance.

35. An apparatus comprising:
bus means;
processing means coupled to the bus means comprising first termination means for selectably terminating the bus means to a termination voltage, which is a high termination voltage, unless the processing means drives the bus means low;

bus control means coupled to the bus means comprising second termination means for selectably terminating the bus means to the termination voltage unless the bus control means drives the bus means low.

36. The apparatus of claim 35 wherein the termination means comprises a plurality of devices, and the processing means further comprises:

compensation means for generating a compensation factor responsive to operating conditions and characteristics of the plurality of devices; and control means for enabling a variable number of the plurality of devices of the termination means depending on the compensation factor.

37. The apparatus of claim 36 wherein the processing means further comprises output driver means coupled to drive the bus means, the output driver means comprising driver pullup means and driver pulldown means, the output driver means being controlled by the control means according to the compensation factor.

38. The apparatus of claim 36 wherein the plurality of devices of the termination means includes first and second termination pullup means having different voltage-current characteristics.

39. The apparatus of claim 38 wherein the first termination pullup means is a P channel MOS transistor, and the second termination pullup means is an N channel MOS transistor, and wherein the P channel MOS transistor and the N channel MOS transistor conduct at the same time to perform termination.

40. A method of transmitting information on a bus in a computer system having a plurality of bus agents coupled to the bus, the method comprising:

driving the bus using a first bus agent selected from the plurality of bus agents;

sensing an operating characteristic of a second bus agent;

generating a compensation factor based on the operating characteristic of the second bus agent; and enabling a variable number of termination devices on the first bus agent from a plurality of termination devices based on the compensation factor and depending on a value driven on the bus unless enabling the variable number of termination devices causes contention with a bus driver on the first bus agent, the enabled termination devices coupling the bus to a termination voltage.

41. The method of claim 40 wherein the bus has a bus impedance and the enabled termination devices each have an impedance of at least twice the bus impedance.

42. The method of claim 40 wherein the plurality of termination devices comprises a N channel MOS transistor and a plurality of P channel MOS transistors.

43. The method of claim 40 wherein the computer system further comprises a first plurality of discrete termination circuits coupled to a first end of the bus and a second plurality of discrete termination circuits coupled to a second end of the bus, and the method further comprises the step of:

terminating the bus with the first and second plurality of discrete termination devices.

44. A circuit comprising:

a driver coupled to drive a signal line;

a termination device coupled to terminate the signal line to a termination voltage; and a control circuit coupled to the termination device to disable the termination device, which is otherwise enabled, from terminating the signal line to the termination voltage in contention with the driver when the signal line is driven to a low voltage.

45. The termination circuit of claim 44 wherein the termination device comprises a plurality of transistor legs and wherein the termination circuit further comprises a process compensation circuit coupled to enable or disable the plurality of transistor legs as a function of an operating characteristic determined by the process compensation circuit.

46. The termination circuit of claim 44 wherein the termination device has a termination impedance of at least twice a signal line impedance.

* * * * *

UNITED STATES PATENT AND TRADEMARK OFFICE
CERTIFICATE OF CORRECTION

PATENT NO. : 6,026,456
DATED : February 15, 2000
INVENTOR(S) : Ilkbahar

It is certified that error appears in the above-identified patent and that said Letters Patent is hereby corrected as shown below:

In column 10, at line 40, delete "selectable" and insert --selectably--.

Signed and Sealed this

First Day of May, 2001

Attest:

NICHOLAS P. GODICI

Attesting Officer     *Acting Director of the United States Patent and Trademark Office*